Oct. 26, 1926.

M. R. COHN 1,604,389

MOTION PICTURE MACHINE

Filed Jan. 24, 1924     5 Sheets-Sheet 1

Inventor

Marvin R. Cohn

By

Attorney

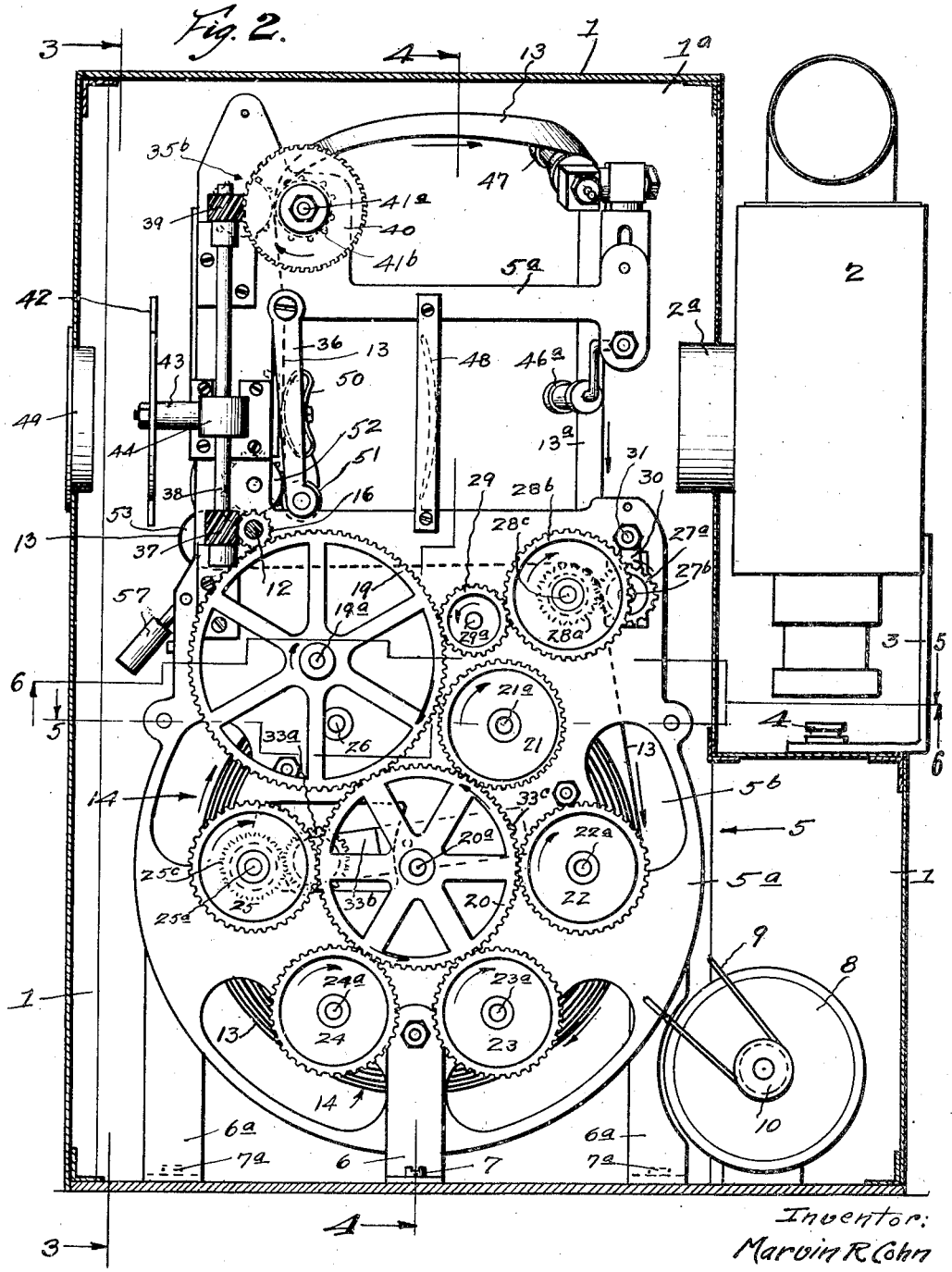

Oct. 26, 1926.
M. R. COHN
1,604,389
MOTION PICTURE MACHINE
Filed Jan. 24, 1924   5 Sheets-Sheet 3
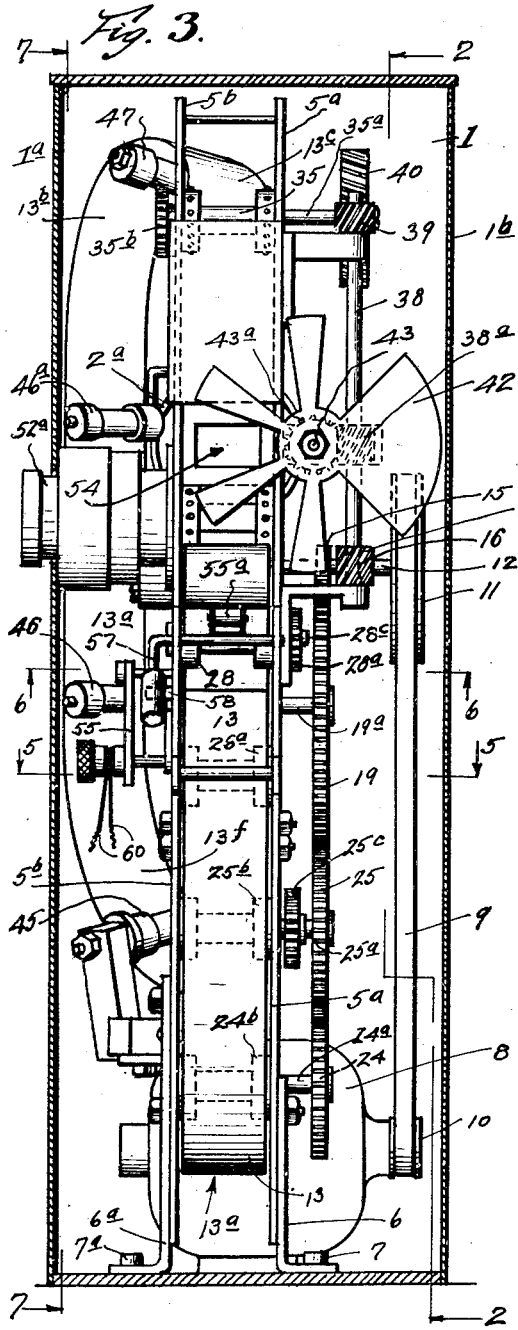
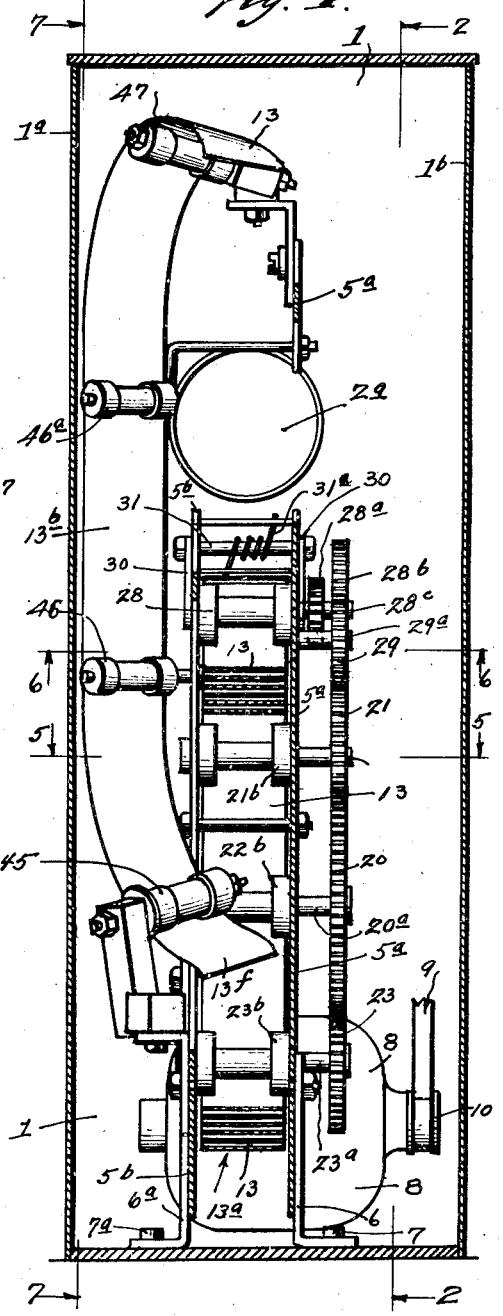
Marvin R. Cohn
By
Attorney

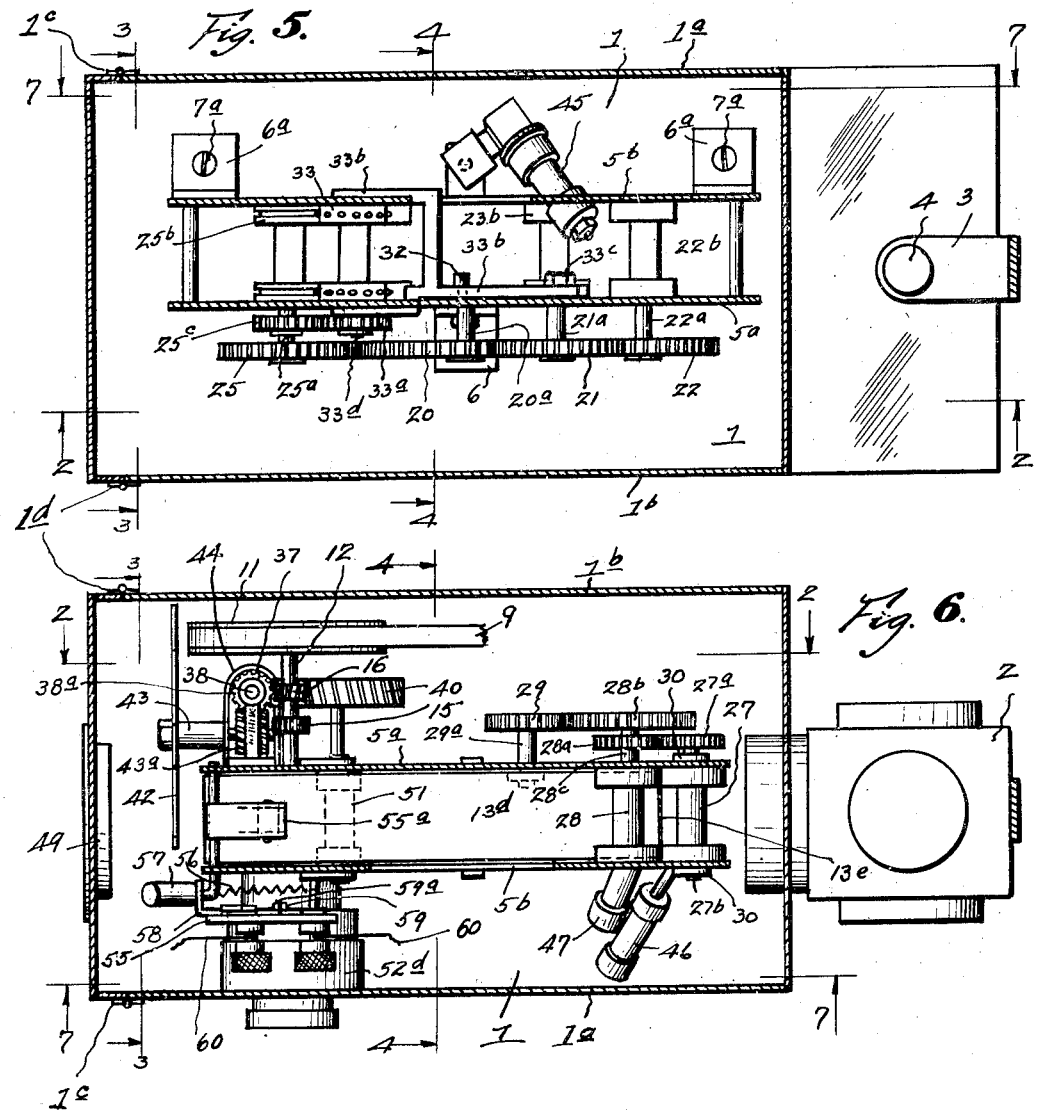

Oct. 26, 1926.
M. R. COHN
1,604,389
MOTION PICTURE MACHINE
Filed Jan. 24, 1924     5 Sheets-Sheet 5
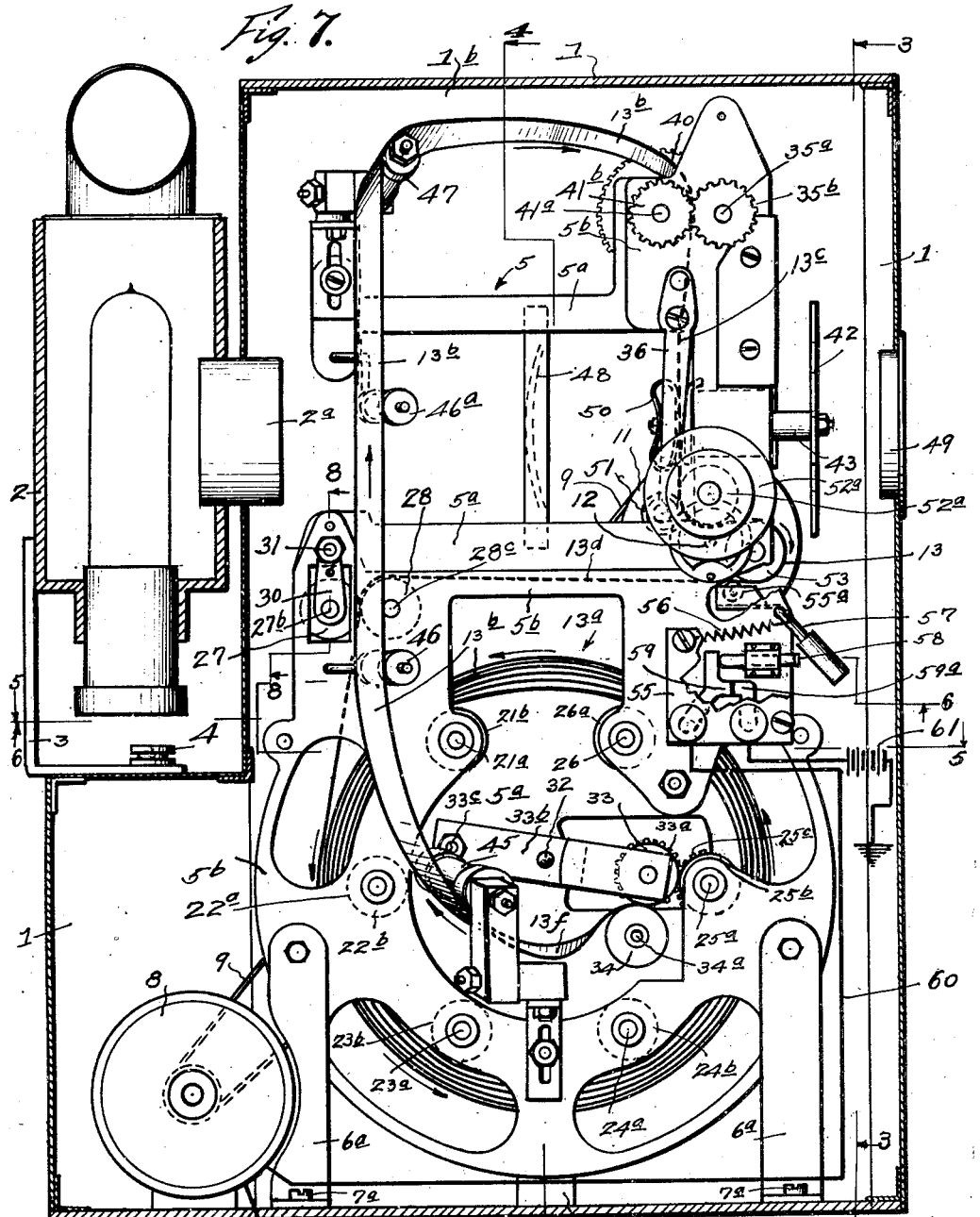
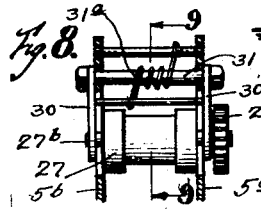
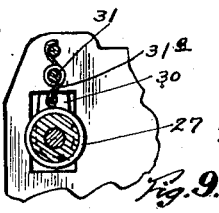
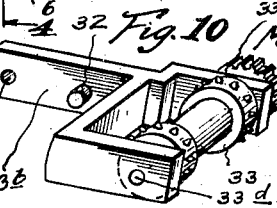
Inventor: Marvin R Cohn
by T. J. Geisler
Attorney Patented Oct. 26, 1926.

1,604,389

UNITED STATES PATENT OFFICE.

MARVIN R. COHN, OF PORTLAND, OREGON, ASSIGNOR TO THE ADVOSCOPE COMPANY, A CORPORATION OF OREGON.

MOTION-PICTURE MACHINE.

Application filed January 24, 1924. Serial No. 688,196.

My invention relates particularly to motion picture machines in which endless film, provided with the usual perforated margins, is to be run continuously over and over during a period of time of considerable length.

The prior machines of this type I found to set up excessive tension in the film in a comparatively short while, and this caused the film to be badly nicked and its marginal perforations to be pulled out rendering the film worthless.

The object of my invention is to provide a motion picture machine in which all undue tensioning of the film is avoided, thus permitting the picture to be repeated indefinitely during a considerable length of time without the constant attention of an operator, and without danger of injury to the film; and in that way lengthening the commercial life of the film, correspondingly increasing its earning capacity, and also facilitating its use.

Undue tensioning of the film is inevitable whenever the devices feeding the film to, or taking it from the sprockets of the light-projecting elements are not properly synchronized. In machines designed to run an endless film the most practicable arrangement is to have the greater portion of the film arranged in the form of a coil. But since such coil—especially in films of considerable length—will be composed of a considerable number of convolutions or rings arranged one within the other, and there is a difference between the diameters of the outer and inner rings of the coil, the differences between the lineal speeds at which the film is paid out from the interior of the coil, and is replaced on its circumference soon tend to develop excessive tension. And these differences can only be accommodated by permitting relative slippage of the rings of the coil on each other, and at the same time feeding the film from the interior of the coil to the light-projecting element, and rewinding on the coil the film section returned from the light-projecting element in absolute synchronism with each other and the movement of the film across the light-projecting element.

I attained my object by arranging, and maintaining the winding of the coiled section of the endless film in a state of looseness, by supporting the coil pendantly on positively driven roller arranged about a point, preferably a centre, located in a vertical plane, so as to revolve the coil, and by feeding the film to the light-projecting element from the interior of the coil and back on the circumference of the latter at a constant rate, through the agency of means adapted to impart a constant, non-slipping, non-yielding, in short a non-varying, driving force to the operative parts, synchronizing them with the movement of the film across the light-projecting element. In this way the essential looseness of said coil is substantially maintained in its initial state; and to this end I do not employ belts, which always permit more or less slippage, nor other devices which depend upon frictional engagement, but preferably employ gears as the positive, non-varying, power-transmitting medium.

An incidental object of my invention is to induce air circulation within the machine, to cool the film, by inducing the vibration of a span of the film. This feature I attain by arranging the intermittent film advancing means and the means for replacing the film section returned from the projecting mechanism, on the circumferences of the coil, such distance apart as to carry a span of film between them, thereby inducing an air circulating vibration of said span during the operation of the machine tending to cool the film.

The foregoing features as well as others incidental thereto, the details of construction, and the operation of my machine, are hereinafter fully described, with reference to the accompanying drawings, in which:

Fig. 2 is a longitudinal vertical section of my motion picture projecting machine taken on the line 2—2 shown in Figs. 3, 4, 5 and 6 of the remaining drawings;

Fig. 3 is a transverse vertical section taken along the line 3—3 shown in Figs. 2, 5, 6 and 7;

Fig. 4 is a transverse vertical section taken approximately on the line 4—4, shown in Figs. 2, 5, 6 and 7;

Fig. 5 is a horizontal plan section looking downwardly, taken approximately on the line 5—5, shown in Figs. 2, 3, 4 and 7;

Fig. 6 is a plan section looking upwardly approximately on the line 6—6 shown in Figs. 2, 3, 4 and 7;

Fig. 7 is a vertical longitudinal section taken approximately on the line 7—7 shown in Figs. 3, 4, 5 and 6;

Fig. 8 is a fragmentary section taken on the line 8—8 of Fig. 7;

Fig. 9 is a similar detail taken along the line 9—9 of Fig. 8; and

Fig. 10 is a fragmentary perspective view showing details of construction.

Figure 1:
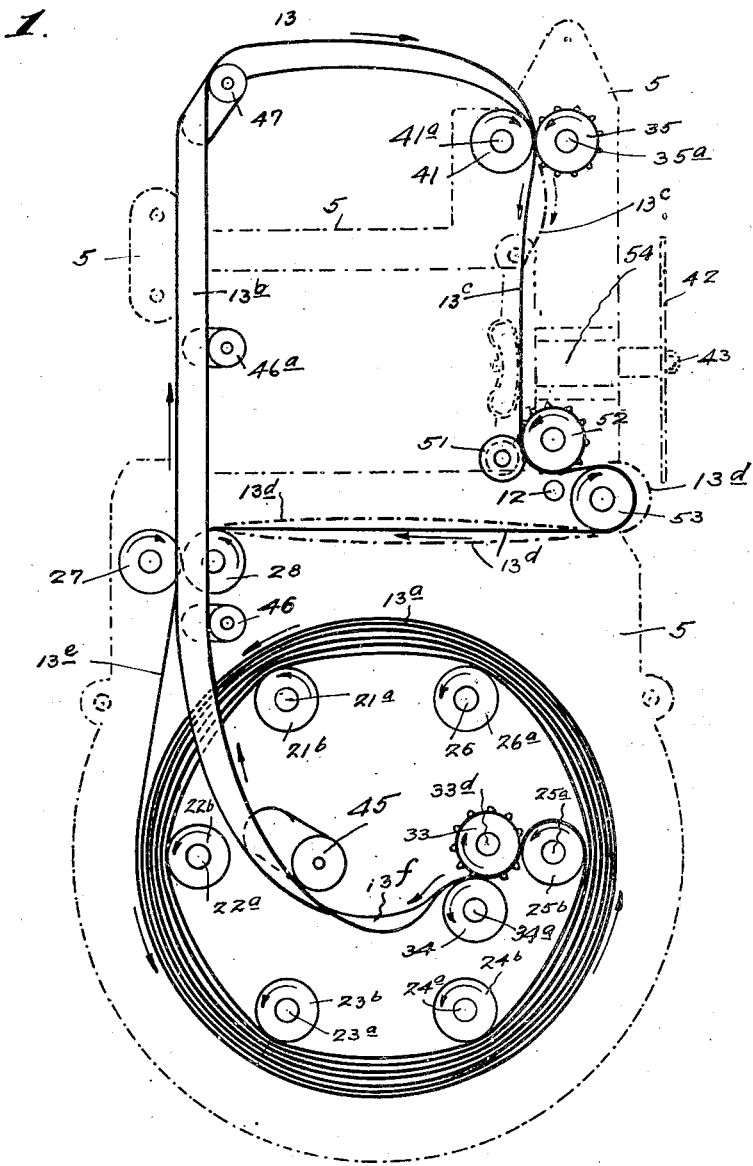
Fig. 1 is a diagrammatic illustration of my motion picture machine embodying means for driving and guiding a continuous film.

From what has hereinbefore been said, and an inspection of Fig. 1, diagrammatically illustrating the construction and operation of my machine, it is evident that the basic characteristic of my machine is the particular arrangement of the film and of the means for conducting and driving the latter.

The film consists of a strip having its ends fastened together so as to constitute an endless band.

Within the case of the machine, are provided a series of rollers $21^b$, $22^b$, $23^b$, $24^b$, $25^b$ and $26^a$ arranged in a circle, and these constitute the carrying elements of the coiled portion $13^a$ of the endless film 13.

The coiled portion must be loosely wound so as to minimize the frictional contact of the over-lying layer comprising the coil with each other, and permitting these layers to have some relative slippage. In that way the inherent stiffness and resiliency of the film keeps the layers of the coiled portions spaced from each other, and prevents the coil from becoming wound too tightly.

The interior convolution of the coiled section of the film is led over the roller $25^b$, sprocket wheel 33 and the rollers 34, and thence over the rollers 45, 46, $46^a$, 47 and 41 to the motion head, the roller 41 cooperating with the feed sprocket 35, and the devices thence over the intermittent sprocket 52 to the roller 53. The latter roller I preferably space a substantial distance from the roller 28 so as to provide a long span of film as at $13^d$ which, due to the rate at which the film is traveling, and the irregular movement of the film by the intermittent sprocket 52, tends to cause said film section $13^d$ to vibrate as indicated by the dash-and-dot-lines and in so doing tends to have a fanning effect, or in other words, induce a circulation of the air within the housing of my machine.

In the arrangement of my device shown by Fig. 1, the loop section of the film $13^f$ is unwound from the interior of the coil, as indicated by the arrows pointing the direction of travel of the film, and the opposite end of the loop section after having passed through the light projecting element is again rewound on the exterior of said coil.

Said rollers and sprockets are all connected to a common, driven, motion transmitting element, so that the film throughout its length travels at a uniform rate relative to its travel past the light projecting element.

I will now describe the construction and operation of my machine in detail and with reference to the other figures of the drawings:

The operating mechanism of my projecting machine is entirely enclosed within the case 1, the removable lamp house 2, the condensers and lens (not shown) are detachably secured to said case. The removable lamp house 2 is supported by an L-shaped bracket 3 which fits under and is removably secured, by the nut 4, to the case 1. It can thus be seen that this machine is very convenient for shipping because the lamp, the lens and the condensers, which are easily broken, can be removed so as to be shipped separately, and the operating mechanism be entirely enclosed in the case to prevent breakage.

The operating mechanism is mounted upon a frame 5 within the case and is made up of two spaced frame sides $5^a$ and $5^b$. (See Figs. 5 and 6). This frame 5 is supported and spaced from the case by legs 6 and $6^a$ which are fastened to the bottom of the container by screws 7 and $7^a$. I have grouped all of the gearing and other driving connections on the outside of the frame $5^a$ and as these all lie substantially in the same plane, and are spaced from the other mechanism, they are adapted to be incased so as to be protected from dust and grit from affecting the mechanism and adapting the casing to be filled with lubricant.

The electric motor 8 is mounted on the bottom of the container and operates the driving mechanism by means of a belt 9 which is mounted over the pulley 10 on the motor and over the pulley 11 on the driving shaft 12 of the mechanism. All of the mechanism of the projecting machine is operatively connected to this shaft 12 and thus all of the parts are driven in absolute synchronism which is difficult to disturb because of the fact that the parts are all driven by a common unit.

The portion of the endless film 13 which is not being exposed, is formed in a coil $13^a$ which lies between the frame sides 5 and $5^a$. This coil is formed about and is supported by a series of driven rollers $21^b$, $22^b$, $23^b$, $24^b$ and a roller $26^a$, all of which rollers are arranged in a circle, and the film thus forms a single coil in which most of the film is carried. The film is fed off of this coil when it is exposed and then fed back on to the coil as described.

The main driving shaft 12 is provided with two gears 15 and 16. (See Fig. 6.) The gear 15 drives said rollers upon which the coil is mounted and a part of the timing mechanism, and the gear 16 drives the shutter and the remaining portions of the timing mechanism as will be hereinafter described.

The train of gears which rotates the rollers upon which the film is coiled, is driven by one large gear 19 on the shaft 19$^a$, which meshes with the gear 15. (See Fig. 3.) The gear 19 drives the gear 20 and the gears 21, 22, 23, 24 and 25, which drive the rollers, co-operate therewith as is shown in Fig. 2. These gears are mounted respectively on shafts 21$^a$, 22$^a$, 23$^a$, 24$^a$ and 25$^a$. The shaft 26 carrying the rollers 26$^a$ is preferably not provided with a driving pinion because I preferably eliminate this connection to permit the gear 19 to lie closely against the frame side 5$^a$.

On shafts 21$^a$, 22$^a$, 23$^a$, 24$^a$ and 25$^a$, I mount rollers 21$^b$, 22$^b$, 23$^b$, 24$^b$, and 25$^b$ and I also mount a roller 26$^a$ on a shaft 26. As before mentioned these rollers arrange in a circle. This constitutes the driving mechanism and the connections thereto for moving the film while it is on the rollers.

I provide feeding mechanism for the film which passes it to the coil, and this mechanism also is driven from the gear 19. Said feeding mechanism comprises two pinch or friction rolls 27 and 28 which are driven by the gear 19 through a train of gears 29, 28$^b$, 28$^a$ and 27$^a$. The gear 29 is mounted on an idling shaft 29$^a$ and meshes with the gear 19 at one side and with the gear 28$^b$ mounted on the shaft 28$^c$, on the other. A smaller gear 28$^a$ is also fixed to the shaft 28$^c$ and meshes with the gear 27$^a$ on the shaft 27$^b$, and thus the rollers 27 and 28 are positively connected and drive each other. The gears 27$^b$ and 28$^a$, being of the same size, drive these rolls at the same rate of speed.

I preferably provide a yielding means for holding the friction rollers 27 and 28 in operative contact because I have found that the film varies in thickness. I have discovered also that laps or joints in the film tend to stick when they are being passed through the friction rollers and therefore I carry the roller 27 on pivoted arms 30, these details being more clearly shown in Figs. 4, 7 and 8. The arms are mounted between the frame sides on the bolt 31, and the roller 27 is held against the roll 28 by a spring 31$^a$. Thus, when the film passes between these rollers it is subjected to uniform pressure although the roller 27 will yield slightly to permit the lapped film sections to pass.

Said pinch or friction rollers control the movement of the film passing to the coil 13$^a$ and I also provide feeding and timing mechanism for controlling the film as it passes off of the coil and this timing mechanism is also actuated by the gear 19.

I provide a timing sprocket element 33 which is carried between the bifurcated portions of the arm 33$^b$ which is pivotally connected to the frame side 5$^a$ by the pivot 33$^c$. (See Fig. 10.) This pivoted arm is held in operative position by a spring controlled pin 32 which extends thru the arm 33$^b$ into the frame side 5$^a$. The sprocket is carried by a shaft 33$^d$ and on this shaft to one side of the bifurcated portion is also fixed the driving pinion 33$^a$. The timing sprocket 33 is pivotally mounted so as to permit it to be swung out of position, when new film is placed on the coil or when it is desired to remove exposed film. The gear 33$^a$ for the timing sprocket 33 meshes with a gear 25$^c$ which is fixed on the shaft 25$^a$. The shaft 25$^a$ is connected, as was hereinbefore described, to the gear 20 and thus the gear 19 drives this gear 33$^a$ when it meshes with the gear 25$^c$. An idler roller 34 on the shaft 34$^a$ holds the film in engagement with the sprocket 33.

The timing and feeding mechanism and the shutter mechanism hereinafter described, receive their power from the driving shaft 12, through the gear 16 which meshes with the gear 37 on the vertical shaft 38. The timing sprocket 35 above the film gate 36 feeds the film past the projecting aperture 54 behind the film gate 36. As before mentioned, the gear 37, on the lower end of the vertical shaft 38 meshes with the gear 16 on the horizontal driving shaft 12. This vertical shaft is also provided with a gear 39 at its upper end and said gear 39 meshes with the gear 40 on the shaft 41$^a$ as shown in Fig. 7. I provide a guide roller 41 which is fixed on the shaft 41$^a$, which co-operates with the driving sprocket 35 on the shaft 35$^a$. I provide similar gears 41$^b$ and 35$^b$ which are fixed on the shafts 41$^a$ and 35$^a$ respectively which drive the roller 41 and the sprocket 35 synchronously. The vertical shaft 38 also carries the mechanism which rotates the shutter 42 which is fixed on the horizontal shaft 43. This connection between the horizontal shaft 43 and the vertical shaft 38 is shown in Fig. 6 and consists of the gears 38$^a$ and 43$^a$. These gears are enclosed within the casing 44 which conceals them in Fig. 2.

The film lies for the greater part between the frame sides 5$^a$ and 5$^b$ as does the supporting and timing mechanism heretofore described, but the loop 13$^b$ of the film 13 which is the portion between the feed sprocket 33 and the timing sprocket 35, necessarily lies without the frame 5$^b$ so as not to intercept any of the light rays that are projected through the machine.

I provide a number of angularly disposed guide rollers 45, 46, 46ª and 47 for guiding the film as it passes outside of the frame.

As is common in most motion picture projecting machines, I provide a concavo-convex lens 48 between the aperture 2ª for the removable lamp house 2, and the aperture 49 provided for the lens. The film gate is provided with a resilient spring 50 which bears upon the film as it passes across the light aperture 54, and functions to hold the film taut and prevents it from buckling and distorting the image projected. At the lower end of the film gate I provide a roller 51 which co-operates with the intermittent sprocket 52 to hold the film in engagement therewith. I provide a roller 53, the lowest point of which is substantially in horizontal alinement with the upper extremity of the roller 28 which is on the opposite side of the machine. This roller 53 receives the film as it passes off from the intermittent sprocket 52. The rollers 28 and 53 being on opposite sides of the machine, support a relatively long span of film between them which lies substantially in a horizontal plane.

I have found that the provision of said long span of film as 13ᵈ between these rollers causes the film to set up a circulation of air within the container 1 when the film is fanned resulting from the intermittent sprocket alternately taking up and paying out the film.

The container is preferably made with hinged sides which constitute doors 1ª and 1ᵇ which permit convenient access into the operating mechanism at each side. The doors 1ª and 1ᵇ are hinged respectively at 1ᶜ and 1ᵈ on the container 1.

I provide an electric switch 55 which is provided with a control finger 55ª which bears against the film 13 at a point directly below the roller 53 as is plainly shown in Figs. 6 and 7. Said roller is made with middle portions of smaller diameter. The control finger 55ª is narrower than this recess so formed and is thus adapted to slip therein. This control finger thus rests on the film above the recess and is held in operative position by the spring 56. Thus, if the film should break, the spring 56 would force the control finger into this recess and this action is adapted to actuate the switch.

The film at this point is alternately slackened off and made taut by the intermittent sprocket 52 which is driven by the shaft 12 through the Geneva movement 52ª, but this does not affect the control finger because it is supported entirely by the stiffness of the film across the recess in the spool and does not depend for its support upon the tension to which the film as a whole is subjected.

The electric switch is provided with said control finger 55ª which is formed in the shape of a bell crank and it is to the arm 57 thereof that this spring 56 is fastened. I provide a sliding trip pin 58 and breaker points 59 and 59ª with which this pin 58 co-operates, and thus when the spring forces the control finger 55ª into the recess on the roller 53, the arm 57 forces the pin 58 towards the left as viewed in Fig. 7 and the pin breaks the contact between the breaker points 59 and 59ª. I have shown the power line as 60 and the breaker points 59 and 59ª in this power line, and thus when the contact is broken the circuit between the source of power 61 and the machine is broken. I preferably connect the lamp which is used for projecting the pictures in this circuit also, and thus the breaking of this circuit will de-energize this light also. I have used the diagram for a battery as showing the source of power 61 but it is to be understood that this source may be any convenient source of electrical energy.

The operation of my device is as follows:

As shown in Fig. 1, starting at the control sprocket 33, the interior convolution of the coiled section of the film at 13ᶠ is fed out from the coil 13ª at a uniform rate of speed and forms a loop 13ᵇ which is guided by means of angularly disposed rollers 45, 46, 46ª and 47 outside of the frame 5 and it re-enters between the two frame sides at the top and is fed downwardly by means of the feed sprocket 35. It is then fed behind the film gate 36 where it is exposed and is fed under the intermittent sprocket 52. At this point it makes substantially a 90° bend and is then bent back upon itself around the roller 53.

As is common in substantially all motion picture projecting machines, the feed sprocket 35 rotates continuously and the intermittent sprocket 52 rotates approximately a quarter of the time and then at approximately four times the rate of speed of the sprocket 35. Both of the sprockets 35 and 52 pass off an equal amount of film, but the feed sprocket 35 feeds to the intermittent sprocket 52 an excess of film during three-quarters of the time and this excess forms a loop which is shown in dotted lines as at 13ᶜ. The intermittent sprocket 52 takes up this excess film and passes it over the roller 53 and this excess film is taken up by the pinch rollers 27 and 28 which are driven in synchronism with the sprockets 33 and 35. But this excess is so taken up by the pinch rollers as to cause a loose span of film at 13ᵈ, between the roller 53 and the roller 28 to be slackened. This alternate slackening and tightening of said section 13ᵈ causes the fanning action of the film heretofore referred to, which sets up a circulation of air within the casing and this circulation of air tends to dissipate the heat generated by the light element which, if it were to become too great, would injure the film.

The film passes from feed rollers 27 and 28 as at 13$^e$, back onto the exterior of the coil 13$^a$. This coil is formed about the rollers 21$^b$, 22$^b$, 23$^b$, 24$^b$, 25$^b$ and 26$^a$ which are arranged in a circle. The interior convolution of the coil then passes over the driven roller 25$^b$ and under the sprocket 33, the two ends of the film being spliced so as to make the film endless. It may appear that the film moving as a body in the coil would not feed off as much film from its interior as it would receive on its exterior because the circumference of the exterior is necessarily larger than the circumference of the hollow center or bore. That is, in one complete revolution of the coil, it would receive more film on its exterior circumference than would be fed off of its interior circumference during this revolution, and thus it would seem as if the coil would receive more film each revolution. In operation, however, these two forces, that is, the tendency of the coil to grow larger in diameter and also the tendency of the coil to increase in lineal capacity, are counteracted by each other due to the inherent rigidity of the film itself. That is, the film tends to be forced on to the coil faster than it is taken away and thus the feed rollers 27 and 28 feed the film on to the roll and the feed sprocket 33 regulates the amount of film taken off of its interior surface and thus the coils of the film tend to slip relatively with each other, and thus maintain a coil of substantially uniform diameter. That is, the feeding of the film on to the coil does not tend to increase the size of the coil either lineally or diametrically, but the separate coils slide relatively to each other and thus maintain the size of the coil constant, resulting from the fact that the sprocket 33 is in absolute synchronism with the feed rollers 27 and 28.

This tendency of the film to be fed out as fast as it is withdrawn is beneficial, because it eliminates the necessity of subjecting the film to tension in order to withdraw it from the coil. Undue tension is the cause of the majority of the breakages in motion picture films. In my machine, the film is subjected to substantially no tension except perhaps the amount which is necessary to carry the loop 13$^b$ of film from the feed sprocket 33 to the feed sprocket 35. If the films should break due to any poor joints or brittle sections, the switch 55 will automatically break the power circuit and cause the motor and the projecting lamp to become de-energized and thus notify the operator that the film must be mended and the discontinuance of operation prevents injury to the mechanism and to the remainder of the film.

While I have described my invention as particularly applicable to a motion picture machine, at the same time, it is to be understood that my invention may also be used advantageously in any picture projecting machine; for instance, such as a stereopticon machine, and, therefore, the claims are to be construed as applying to the latter type of machine also.

I claim:

1. In a motion picture machine of the character described having driven sprockets moving the film across the light-projecting element, an endless film having marginal perforations for engagement by said sprockets and having its major portion arranged in the form of a loosely wound coil; a series of positively driven rollers arranged about a point in a vertical plane, on which rollers said coil is arranged and is pendantly supported; and driving means adapted to transmit a constant, non-varying, driving force to said driven coil-supporting rollers, in synchronism with the sprockets of said light-projecting element, whereby said coiled film section is maintained substantially in its initial state of looseness.

2. In a motion picture machine of the character described having driven sprockets moving the film across the light-projecting element, an endless film having marginal perforations for engagement by said sprockets and having its major portion arranged in the form of a loosely wound coil; a series of positively driven rollers arranged about a point in a vertical plane, on which rollers said coil is arranged and is pendantly supported; means for paying out to said light-projecting element the inner convolutions of said coil, and driving means adapted to transmit a constant, non-varying, driving force to said driven coil-supporting rollers, and said film paying-out means in synchronism with the sprockets of said light-projecting element, whereby said coiled film section is maintained substantially in its initial state of looseness.

3. In a motion picture machine of the character described having driven sprockets moving the film across the light-projecting element; an endless film having marginal perforations for engagement by said sprockets and having its major portion arranged in the form of a loosely wound coil; a series of positively driven rollers arranged about a point in a vertical plane, on which rollers said coil is arranged and is pendantly supported; means for paying out to said light-projecting element the inner convolutions of said coil, such means including a sprocket cooperating with one of said rollers, and driving means adapted to transmit a constant, non-varying, driving force to said driven coil-supporting rollers, and said sprocket of the film-paying-out means in synchronism with the sprockets of said light-projecting element, whereby said coiled film section is maintained substantially in its initial state of looseness.

4. In a motion picture machine of the character described having driven sprockets moving the film across the light-projecting element, an endless film having marginal perforations for engagement by said sprockets and having its major portion arranged in the form of a loosely wound coil; a series of positively driven rollers arranged about a point in a vertical plane, on which rollers said coil is arranged and is pendantly supported; means for paying out to said light projecting element the inner convolutions of said coil; means operating to replace on the circumference of said coil the film section returned from said light-projecting element; and driving means adapted to transmit a constant, non-varying, driving force to said driven coil-supporting rollers, said film-paying-out means and said film-replacing means in synchronism with the sprockets of said light-projecting element, whereby said coiled film section is maintained substantially in its initial state of looseness.

5. In a motion picture machine of the character described having driven sprockets moving the film across the light-projecting element; an endless film having marginal perforations for engagement by said sprockets and having its major portion arranged in the form of a loosely wound coil; a series of positively driven rollers arranged about a point in a vertical plane, on which rollers said coil is arranged and is pendantly supported; means for paying out to said light-projecting element the inner convolutions of said coil, such means including a sprocket cooperating with one of said rollers; means operating to replace on the circumference of said coil the film section returned from said light-projecting element; and driving means adapted to transmit a constant, non-varying, driving force to said driven coil-supporting rollers, said film-paying-out means and said film-replacing means in synchronism with the sprockets of said light-projecting element, whereby said coiled film section is maintained substantially in its initial state of looseness.

6. In a motion picture machine of the character described having driven sprockets moving the film across the light-projecting element, an endless film provided with marginal perforations for engagement by said sprockets and having its major portion arranged in the form of a loosely wound coil; a series of positively driven rollers arranged about a point in a vertical plane, on which rollers said coil is arranged and is pendantly supported; means for paying out to said light-projecting element the inner convolutions of said coil, such means including a sprocket cooperating with one of said rollers; a driven-sprocket arranged to replace on the circumference of said coil the film section returned from said light-projecting element; and driving means adapted to transmit a constant, non-varying, driving force to said driven coil-supporting rollers, said sprocket of the film-paying-out means and said film-replacing sprocket in synchronism with the sprockets of said light-projecting element, whereby said coiled film section is maintained substantially in its initial state of looseness.

7. In a motion picture machine of the character described, a series of positively driven rollers arranged about a point in a vertical plane and adapted to support, pendantly, a coiled section of the film used in the machine, and driving means adapted to transmit a constant, non-varying driving force to said driven rollers in synchronism with the devices moving the film across the light-projecting element of the machine whereby the coil of film supported by said driven rollers is maintained substantially in the state of its initial looseness.

8. In a motion picture machine of the character described, a series of positively driven rollers arranged about a point in a vertical plane and adapted to support, pendantly, a coiled section of the film used in the machine; means for paying out the inner convolution of said coiled section to the light-projecting element of the machine; and driving means adapted to transmit a constant, non-varying, driving force to said driven rollers and said film paying-out means in synchronism with the devices moving the film across the light-projecting element of the machine, whereby the coil of film supported by said driven rollers is maintained substantially in the state of its initial looseness.

9. In a motion picture machine of the character described, a series of positively driven rollers arranged about a point in a vertical plane and adapted to support, pendantly, a coiled section of the film used in the machine; means for paying out the inner convolutions of said coiled section to the light projecting element of the machine, such means including a sprocket cooperating with one of said rollers; and driving means adapted to transmit a constant, non-varying, driving force to said driven rollers, and said sprocket of the film paying-out means in synchronism with the devices moving the film across the light-projecting element of the machine, whereby the coil of film supported by said driven rollers is maintained substantially in the state of its initial looseness.

10. In a motion picture machine of the character described, a series of positively driven rollers arranged about a point in a vertical plane and adapted to support, pendantly, a coiled section of the film used in said machine; means for paying out the inner convolutions of said coiled section to the light-projecting element of the machine; means operating to replace on the circumference of said coiled film-section that portion of the film returned from said light-projecting element; and driving means adapted to transmit a constant, non-varying, driving force to said driven rollers, said film paying-out means and said film-replacing means in synchronism with the devices of said light-projecting element, whereby the coil of film supported by said driven rollers is maintained in the state of its initial looseness.

11. In a motion picture machine of the character described, having driven sprockets for moving a film across the light-projecting element; a series of positively driven rollers arranged about a point in vertical plane and adapted to support, pendantly, a coiled section of the film used in said machine; means for paying out the inner convolutions of said coiled section to the light-projecting element of the machine, such means including a sprocket cooperating with one of said rollers; a driven sprocket arranged to replace on the circumference of said coiled film-section that portion of the film returned from said light-projecting element, and driving means adapted to transmit a constant, non-varying, driving force to said driven rollers, said sprocket of the film paying-out means, and said film-replacing sprocket in synchronism with the sprockets of said light projecting element, whereby the coil of film supported by said driven rollers is maintained in the state of its initial looseness.

12. In a motion picture machine comprising a casing, an endless film having its major portion arranged in the form of a loosely wound coil, means located within said coil, adapted to have engagement with a section of the inner ring thereof, and paying out the coil, intermittent means for advancing the film section passing the projecting mechanism of the machine, means adapted to have engagement with the return film-section and to feed the same to the exterior of said coil, and means for operating said means for paying out said coil, said intermittent film-advancing means, and said means feeding the return-section of the film to the coil in synchronism with each other and the projecting mechanism of the machine, said intermittent film-advancing means and said means for feeding the return-film-section to the exterior of the coil being located so as to carry a span of film of substantial length between them across the interior of the case over said coil, thereby to induce an air-circulating vibration of said span tending to cool the film.

MARVIN R. COHN.